United States Patent [19]
Cosimati

[11] Patent Number: 4,546,602
[45] Date of Patent: Oct. 15, 1985

[54] CHILI PEPPER HARVESTER

[76] Inventor: Robert O. Cosimati, 2005 Burke Rd., Las Cruces, N. Mex. 88005

[21] Appl. No.: 303,111

[22] Filed: Sep. 17, 1981

[51] Int. Cl.$^4$ ............................................. A01G 19/00
[52] U.S. Cl. ...................................... 56/327 R; 56/330
[58] Field of Search ................. 56/126, 127, 128, 129, 56/130, 327 R, 327 A, 330, 331, 328 R, 27.5

[56] References Cited

U.S. PATENT DOCUMENTS

| | | | |
|---|---|---|---|
| 2,709,330 | 5/1955 | Lafferty et al. | 56/327 A |
| 2,874,528 | 2/1959 | Esch | 56/126 |
| 3,071,196 | 1/1963 | Scheidenhelm | 56/327 R |
| 3,101,581 | 8/1963 | Kelso et al. | 56/328 R |
| 3,385,042 | 5/1968 | Christie et al. | 56/330 |
| 3,410,064 | 11/1968 | Curtis et al. | 56/128 |
| 3,543,492 | 12/1970 | Nixon | 56/328 R |
| 3,568,419 | 3/1971 | Creager | 56/126 |
| 3,596,457 | 8/1971 | Van Tine et al. | 56/330 |
| 3,736,738 | 6/1973 | Carr | 56/330 |
| 3,830,048 | 8/1974 | Ervin | 56/331 |
| 3,986,324 | 10/1976 | Harriott et al. | 56/327 R |
| 4,196,570 | 4/1980 | Rodriguez | 56/330 |

Primary Examiner—Robert Peshock
Assistant Examiner—David I. Tarnoff
Attorney, Agent, or Firm—Harvey B. Jacobson

[57] ABSTRACT

A harvester for chili peppers and the like including a frame structure supported from a tractor or similar vehicle for movement along one or more rows of plants with the frame including rotatably supported picking units for removing chili pods from the plants and depositing them onto adjacently oriented longitudinally extending conveyors with the picking operation leaving the plants substantially unharmed so that the plants can continue to grow additional pods. The picking units are rotatably driven by a single hydraulic motor communicated with the hydraulic system of the tractor and the picking units can be vertically adjusted by hydraulic rams or the like connected with the hydraulic system of the tractor to enable the operator to control operation of the harvester. Each of the picking units includes a rotatable shaft having a plurality of radially extending rods mounted thereon with each of the rods including an arcuately curved hook-shaped end portion pointing in the direction of rotation with the rods being oriented in two spiral rows around the shaft with the two rows being 180° out of phase and with each row extending a full 360° around the shaft.

14 Claims, 5 Drawing Figures

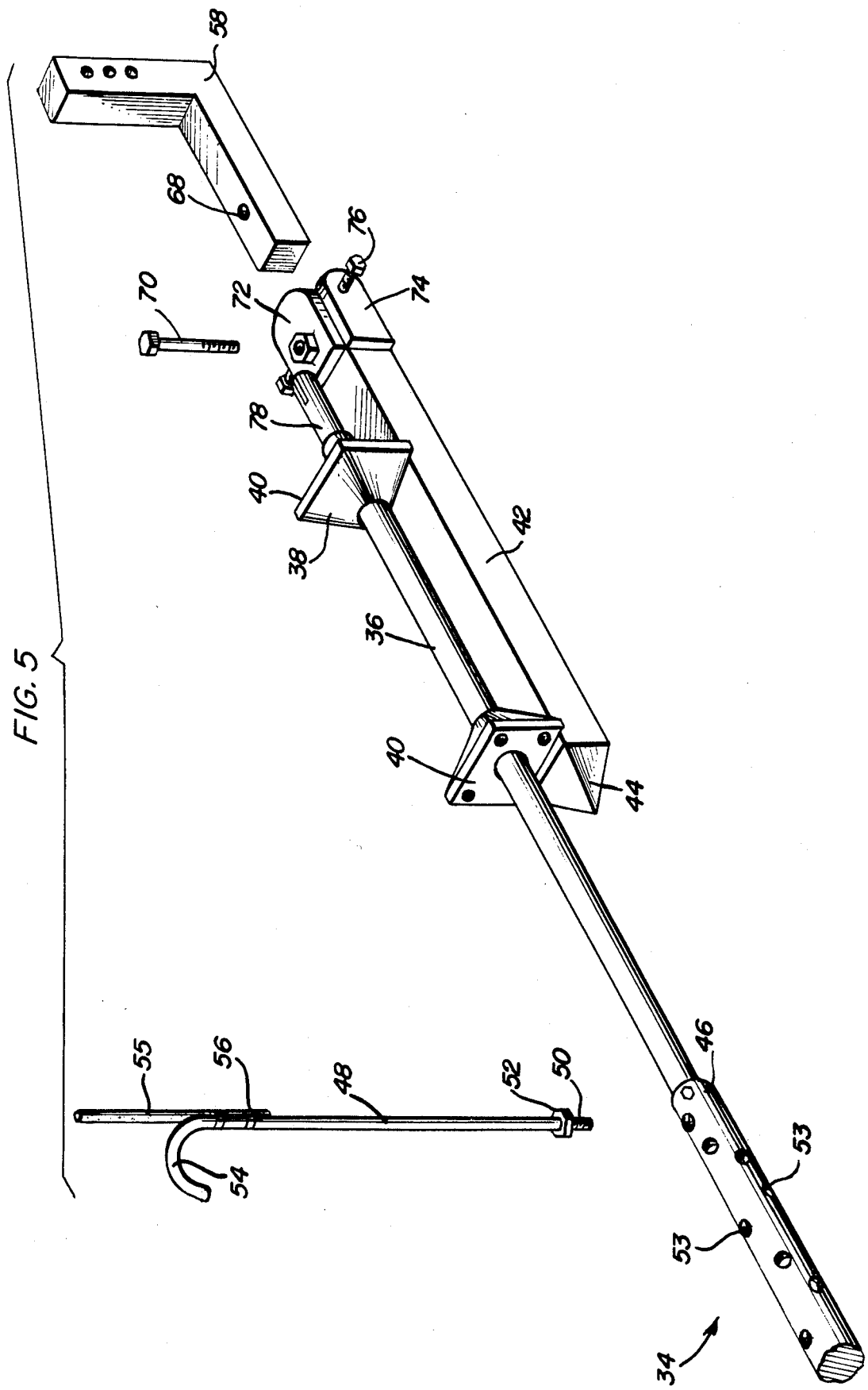

CHILI PEPPER HARVESTER

BACKGROUND OF THE INVENTION

1. Field of the Invention

The present invention generally relates to a vegetable harvester and more particularly a harvester for chili peppers and the like for removing green or red chili pods from a row or rows of pepper plants without damage to the chili pods or the plants and conveying the harvested peppers to a collection point, thereby efficiently harvesting peppers without requiring hand picking.

2. Description of the Prior Art

Harvesters of various types have been provided which involve the picking or removal of produce from living plants with the various existing harvesters being specifically adapted for harvesting certain vegetables, fruits, and the like. U.S. Pat. No. 4,196,570, issued Apr. 8, 1980, to Henry Rodriguez, discloses a harvester for chili peppers, and the like, which includes a spiral guide member that is disposed adjacent ground level and passes between the plants in a row which requires a correlation between the forward speed of the vehicle and the rotational speed of the spiral or helical guide member when considering the longitudinal spacing of the plants. When this correlation is not maintained, the helical guide member can engage and thus damage the stem portion of the plants. As can be appreciated, it is somewhat difficult to maintain the proper correlation between the spacing of the plants, the forward speed of the vehicle and the rotational speed of the helical guide member. This patent also includes picking elements having a particular configuration for harvesting peppers, other vegetables or fruits which, in effect, include a loop-like structure which sometimes can grip and pull leaves from the plant as well as the vegetables or fruit. Accordingly, there is a need for a harvester which will more efficiently pick chili peppers and the like without damage or injury to the produce being picked or the plants from which the produce is picked.

SUMMARY OF THE INVENTION

An object of the present invention is to provide a chili pepper harvester including a frame structure attachable to or incorporated into a tractor or similar vehicle with the harvester also including picking units mounted thereon for vertical and lateral adjustment combined with conveying structures for receiving chili pods removed from the plants and conveying them to a collecting point, with the picking units including a plurality of radially extending rods supported from a rotatable generally horizontal shaft and having curved, generally hook-shaped free ends pointed in the direction of rotation for engaging and removing chili pods without injury to the plants and without damage to the chili pods.

Another object of the invention is to provide a chili pepper harvester in accordance with the preceding object in which the rods in each picking unit are detachably secured to a solid shaft welded to and forming an extension of driven shaft with the rods being oriented in a pair of spiral rows with each spiral row of rods oriented so that each row extends 360° around the shaft, but with the two rows being 180° out of phase.

A further object of the invention is to provide a harvester in accordance with the preceding objects in which the picking unit shafts are driven by a single hydraulic motor and the vertical elevation of the shafts may be varied by hydraulic ram units with the motor and ram units being communicated with the hydraulic system of the tractor or similar vehicle, so that an operator may control operation of the harvester from the tractor or vehicle.

Still another object of the invention is to provide a chili pepper harvester in accordance with the preceding objects which is relatively simple in construction, long lasting and durable, effective for picking peppers and similar vegetables or fruits from row plants without damage to the produce removed from the plant and without damage to the plant and effectively deposit the picked produce onto upwardly and rearwardly inclined conveyor structures for conveyance to a point of collection.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an exploded group perspective view of one of the picking units illustrating the shaft, and picking rods mounted thereon, together with the supporting and adjusting structure therefor.

DESCRIPTION OF THE PREFERRED EMBODIMENT

Figures 1, 2:
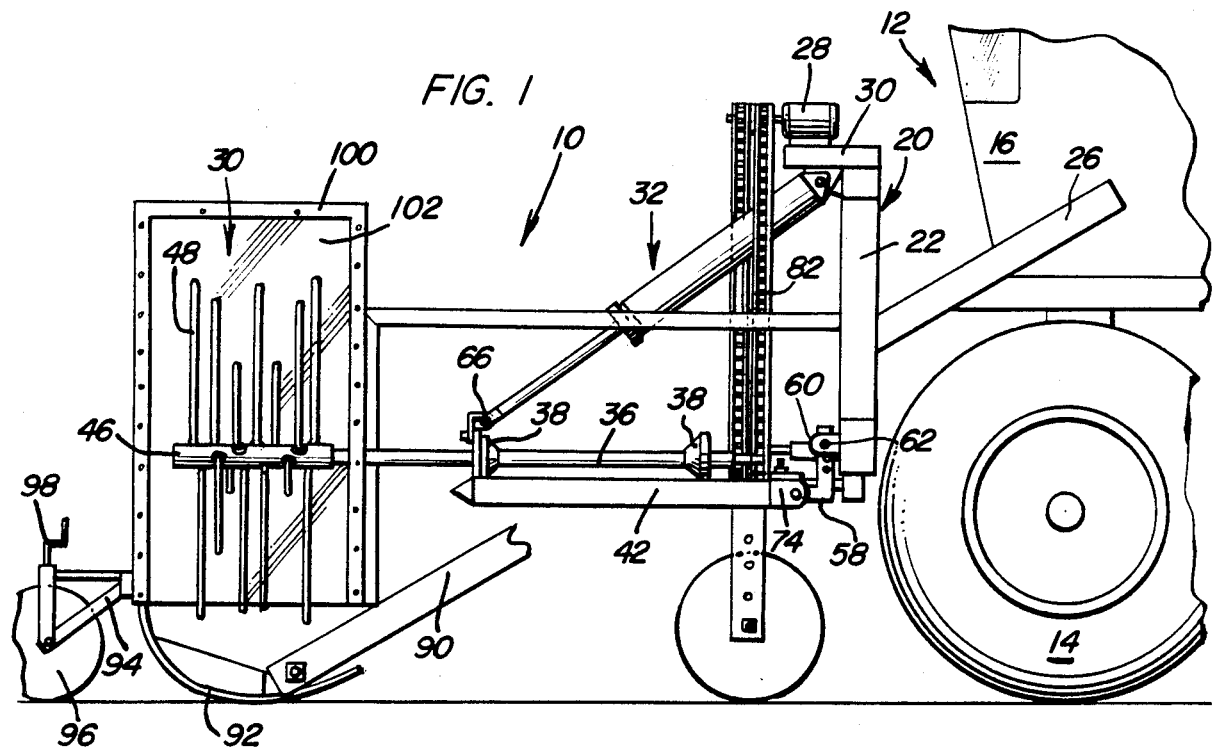
FIG. 1 is a side elevational view of the chili pepper harvester of the present invention illustrating its association with a typical tractor.
FIG. 2 is a front elevational view of the harvester of the present invention.
Figure 3:
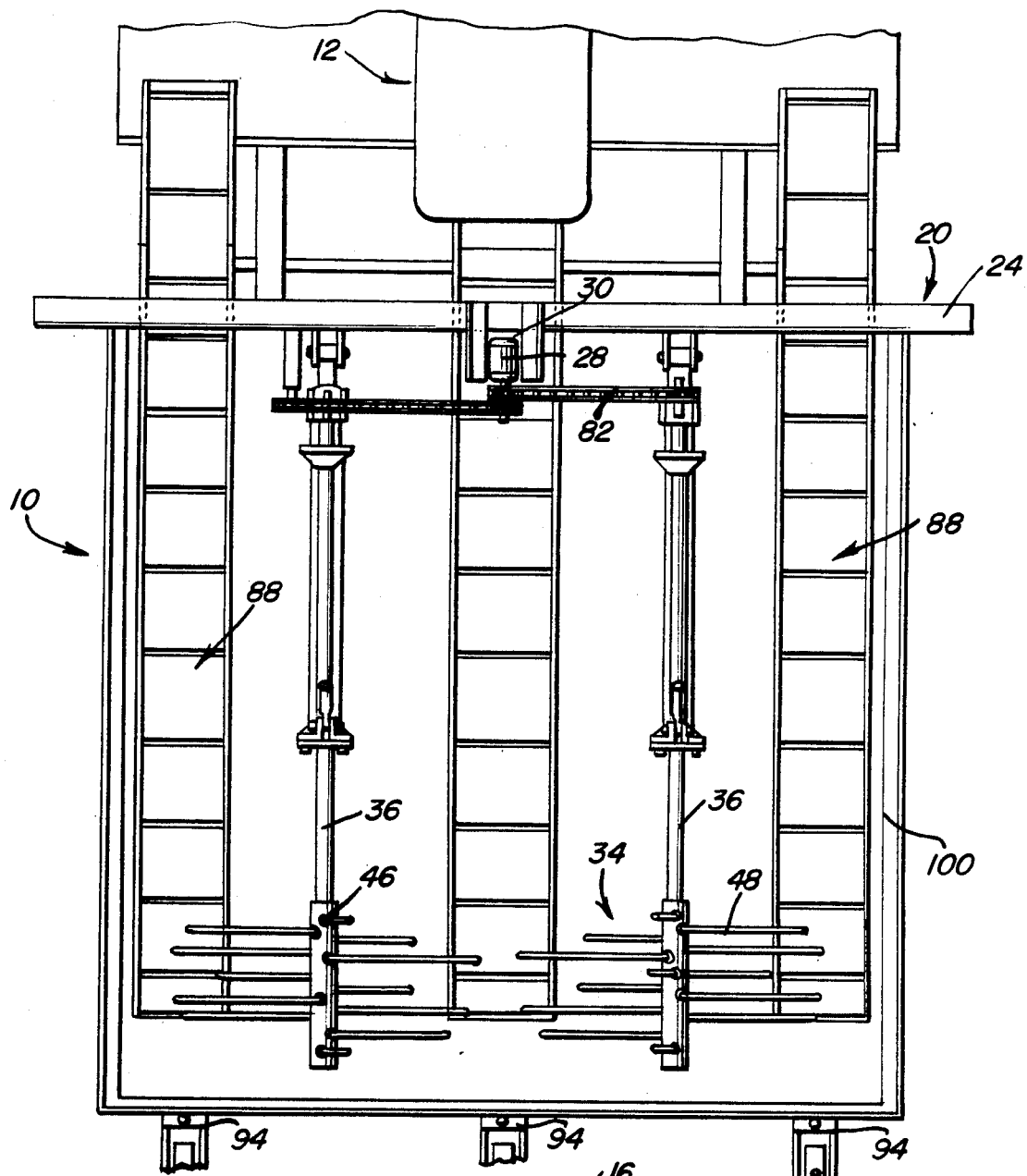
FIG. 3 is a top plan view of the harvester with portions omitted for clarity.

Referring now specifically to the drawings, the chili pepper harvester of the present invention is generally designated by the numeral 10 and is mounted forwardly of a conventional tractor 12 having the usual front wheels 14, operator's cab 16, steering wheel 18 and hydraulic system with manual control valves (not shown) in the cab accessible to the operator. Hydraulic control valves for controlling the operation of a farm implement connected with the hydraulic system of the tractor represents a conventional and well known technique and the details thereof are not shown in the present application. The harvester 10 includes a generally vertically disposed frame 20 oriented forwardly of the tractor and including vertical frame members 22 and horizontal frame members 24, with the frame 20 being supported by frame brackets 26 attached to the tractor in any suitable manner. Supported from the framework 20 is a single hydraulic motor 28 supported by a horizontal bracket plate 30, or the like, and a plurality of hydraulic rams 32 also have one end pivotally attached to brackets at the upper end of the frame as illustrated in FIGS. 1 and 2, with the rams 32 being conventional hydraulically actuated piston and cylinder assemblies having one end connected to the upper end portion of the frame 20. The hydraulic hoses and valve structure for controlling operation of the motor 28 and the rams 32 are not shown in detail.

Projecting forwardly from the frame 20 is a pair of picking units, each of which is designated generally by reference numeral 34. Each picking unit includes a shaft 36 which may be in the form of a hollow pipe or the like having its rearward end portion journaled in spaced bearings 38 which are in the form of flanged bearings supported on plates 40 rigidly affixed to an elongated supporting frame member 42 in the form of an elongated downwardly opening channel-shaped member having a pointed, closed forward end 44 to penetrate through the plants 45 in a row of plants without injury to the plant leaves 47, stem and stalk and without injury to the chili pods 49 supported thereon. The forward end of the shaft 36 has a solid shaft 46 welded or otherwise rigidly affixed to and forming an axial extension of shaft 36. Secured to shaft 46 is a plurality of picking rods or elements 48 each of which includes a threaded inner end portion 50 and a lock nut 52 to secure the rods detachably in threaded sockets 53 in the shaft 46. Each of the rods 48 extends radially from the shaft 46 and terminates in a reversely curved end portion 54 which is in the form of a hook-like construction with the radius of curvature of the curved end 54 being greater than the longitudinal distance between adjacent sockets 53. The sockets 53 and thus the rods 48 are oriented in two spiral rows on the shaft 46 with the spiral rows being disposed in 180° out of phase relationship to each other and each row of sockets extends completely around the shaft, that is, 360°. Preferably, there are 15 picking rods 48 with one spiral row of sockets including eight sockets and the other row including seven sockets. The hooked ends 54 point angularly in the direction of rotation of the shaft 36 so that chili pods 49 are engaged by the hooked ends 54 of the picking rods and pulled from the plant 45. Every second rod 48 is provided with a rubber hose 55 attached to to picking rod 48 by metal clips 56 or the like. The flexible hoses 55 extend beyond the hook ends 54 as shown in FIG. 5.

The rearward end of the channel-shaped support 42 is connected to an angled mounting bracket 58 which is supported from the frame 20 by a pair of lugs 60 and a pivot pin or bolt 62 extending through one of a plurality of vertically spaced holes 64 formed in the vertical edge of the brackets 58 to enable pivotal movement of the supporting channel 42 and the shaft 36 about a transverse axis defined by the pivot pin or bolt 62. The vertical pivotal movement or adjustment is obtained by extending or retracting the hydraulic ram 32 which has its lower end pivotally attached to the forwardmost bracket plate 40 by a pivot pin or bolt 66. The horizontal portion of the angled bracket 58 is provided with a vertical hole 68 which receives a vertical bolt 70 extending through a lug 72 on the top wall of the channel 42 so that the horizontal leg of the angled brackets 58 will provide limited swinging movement of the channel 42 laterally about a vertical axis defined by the bolt 70. Each side of the channel 42 is provided with a lug 74 having a set screw 76 extending therethrough for engagement with the side surfaces of the horizontal leg of the angled bracket 58 in order to adjust and lock the frame and shaft in horizontally adjusted position. There is little necessity of adjusting the horizontal attitude of the shaft 36 since most of the plants in a particular field will be in uniformly spaced rows. The vertical orientation of the shaft and the picking unit may be varied more easily by the hydraulic ram to enable variation in the picking height of the picking unit 34.

Figure 4:
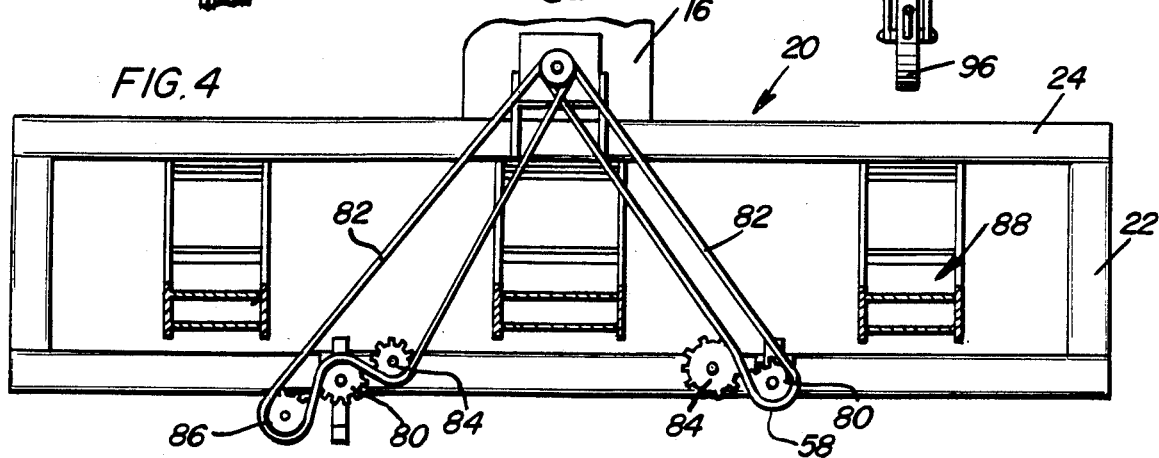
FIG. 4 is a transverse sectional view immediately forwardly of the drive motor illustrating the association of the frame, drive motor, chains and sprockets.

The rearward end of the shaft 36 is provided with a reduced extension 78 having a sprocket gear 80 mounted thereon on which a drive sprocket chain 82 is entrained. As illustrated in FIG. 4, the motor 28 drives two sprocket gears and two sprocket chains 82, with one of the sprocket chains encircling under a sprocket gear 80 and over a single idler sprocket gear 84 with the other sprocket chain 82 extending under an idler gear 84, over the drive sprocket 80 and then under a second idler sprocket gear 86 so that the two sprocket gears 80 will rotate in opposite directions, thus rotating the picking units in opposite directions. When standing in front of the harvester and observing the rotational direction of the picking units, the right hand picking unit will rotate counterclockwise and the left hand picking unit will rotate clockwise. This arrangement assures that as the picking rods or arms 48 sweep through the pepper plant 45, the hook-shaped ends 54 will engage the stems of the chili pods 49 and disengage the chili pods from the plant without injury to the leaves 47 and discharge the chili pods by gravity toward the outer side of the harvester where the chili pods drop onto upwardly and rearwardly extending elevator conveyors 88 which are of the belt and slat type conveyor structure conventionally employed in many harvesters for vegetables, fruits, and the like. Each conveyor 88 includes a frame 90 connected with the supporting frame structure with a rounded trough-like structure 92 at the forward end thereof forming a skid for engaging the ground surface and also providing a trough-like structure for gathering any chili pods discharged in this area with the lower end of the slatted belt conveyor 88 extending into the trough-like structure in order to pick up any chili pods therein. The flexible, resilient hoses 55 which extend beyond the hook ends 54 of the rods 48 move chili pods that may fall to the floor of the frame onto the elevator conveyor 88.

Extending forwardly of the harvester is a supporting structure 94 for gauge wheels 96, one in the center and one adjacent each side of the harvester, with a manual hand crank 98 or the like being provided to vary the vertical position of each gauge wheel. The supporting frame 97 for each of the gauge wheels 96 is supported from a framework 100 which extends vertically and transversely in relation to the machine and encloses the front and sides of the conveyors, other than the areas which face the picking units, with the framework being covered by wire mesh 102 or the like, thus leaving open areas 104 for receiving each of the plant rows as illustrated in the front elevational view in FIG. 2. The screen or closure material, which may be sheet metal, prevents plants from coming into engagement with the conveyor belts and the like, and forwardly tapering or inclined structures may be utilized to guide the plants 45 into the spaces 104 so that as the picking units 34 are rotated in the manner set forth, the chili pods will be picked from the plants and deposited on the conveyor. Any suitable driving mechanism (not shown) for the conveyors may be provided, including hydraulic motors, and the upper ends of the conveyors may terminate in communication with a chute or lateral conveyor for taking the picked chili pods to a collection point, such as a container or bin or a separate vehicular structure, such as a truck body or the like.

The rearward portion of the frame is supported by a gauge wheel 106 supported by a vertical bracket 108 that is attached to the channel 42 in any suitable manner to enable vertical adjustment thereof if necessary. The specific details of the mounting structures for the gauge wheels and the conveyors are not specifically illustrated, since these are conventional components and form no essential part of the present invention.

The picking units and their association to the other components of the harvester and the drive structure for the picking units and the adjustment for the picking units constitutes the essential components of the invention with the other components cooperating therewith to provide an efficient harvester for peppers, either red chili or green chili peppers, or any other similar vegetables, fruits, or the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A harvester for produce such as chili peppers comprising frame means adapted to be supported from a tractor-type vehicle for traversing rows of plants for picking produce therefrom, at least one picking unit adjustably mounted on said frame means, said picking unit including a rotatable member disposed generally parallel to the row of plants and a plurality of picking members mounted radially of the rotatable member, said picking members terminating in free end portions spaced circumferentially around the rotatable member each picking member including means on the end portion thereof for engaging produce on a plant and removing the produce from the plant in response to rotation of the rotatable member and forward movement of the frame means, each picking member being in the form of an elongated rod, said means on the end of the picking member including a U-shaped end portion on the rod defining a substantially hook-like configuration with a large radius of curvature with the free end of the U-shaped portion of the rod extending toward the direction of rotation of the rotatable member and inwardly toward the rotatable member, said rotatable member being drivingly connected to a motor.

2. The structure as defined in claim 1, wherein said rotatable member includes a shaft, said plurality of picking members being mounted on said shaft in two spiral rows with the spiral rows being oriented in 180° out of phase relationship, each spiral row of picking members extending completely around the periphery of the sleeve and extending from end to end thereof.

3. The structure as defined in claim 2, together with conveying means along each side of the picking unit for receiving produce removed from the plants as the produce is moved laterally into a position above the conveying means for gravity movement of the produce onto the conveying means as it is removed from the plants.

4. The structrure as defined in claim 3, wherein said frame means includes gauge wheels adjacent the forward and rearward ends thereof.

5. The structure as defined in claim 3, wherein said rotatable member is drivingly connected to a hydraulic motor through a sprocket chain and sprocket gear arrangement, said rotatable member including a longitudinally extending frame member supporting it from said frame means for vertical arcuate movement and lateral arcuate movement about the rearward end thereof with the vertical arcuate movement being controlled by hydraulic ram means connecting the frame member and frame means.

6. In a harvester for produce pods growing on plants such as vegetables and the like including a mobile frame with driven rotatable picking units and conveying means mounted thereon for removing the produce from the plants and conveying it to a collecting area, that improvement comprising each picking unit including a rotatable shaft having a rotational axis generally paralleling rows of plants from which produce is being picked, a plurality of longitudinally and circumferentially spaced picking elements supported on said shaft, each picking element including an elongated rod extending radially of the shaft, said rod terminating in a hook-shaped free end portion having a large radius of curvature, said hook-shaped end portions being angled in relation to the path of movement of the rods and adapted to move upwardly through a plant to engage produce pod stems adjacent the produce pods to separate the produce pods from their stems without damaging the produce pods or the plant and deposit the pods onto the conveying means.

7. The picking unit as defined in claim 6, wherein said picking rods are arranged in two spiral rows with each row extending completely around the circumference of the shaft, said rows having a starting point on opposite sides of the shaft.

8. The picking unit as defined in claim 7, wherein said shaft includes a plurality of radially disposed, internally threaded sockets, the inner end of each picking rod being threaded into one of said sockets.

9. The picking unit as defined in claim 7, wherein the radius of the hook-shaped end portion is greater than the longitudinal distance between longitudinally adjacent rods thereby assuring that the end portions of the picking rods will move through all of the plant foliage.

10. The picking unit as defined in claim 9, wherein said picking unit shafts are driven by a single hydraulic motor and means drivingly connecting the motor and shafts to drive the shafts in opposite directions so that the picking rods move upwardly through the plants on opposite sides thereof during movement of the picking units between adjacent rows of plants.

11. The picking unit as defined in claim 6 wherein certain of said picking elements include a flexible hose attached to the rod and extending axially beyond the hook-shaped end portions for moving dropped pods onto the conveying means.

12. The structure as defined in claim 1 wherein certain of said picking elements include an elongated resilient member attached to the outer end portion of the elongated rod and extending axially therefrom beyond the U-shaped end portion.

13. The structure as defined in claim 12 wherein said rotatable member is in the form of a shaft, said frame means including a forwardly extending frame member rotatably supporting the rearward end portion of the shaft at longitudinally spaced points with the forward end of the shaft extending beyond the frame member, said picking elements being mounted on the forward end of the shaft forwardly of the frame member, means connecting the rearward end of the frame member to the frame means to enable the frame member to move pivotally about a substantially horizontal axis and about a substantially vertical axis, adjustable means limiting pivotal movement about the substantially vertical axis and hydraulic ram means interconnecting the frame means and forward end portion of the frame member to pivot the frame member about the substantially horizontal axis to orient the picking elements in relation to the plants from which produce is being removed.

14. The structure as defined in claim 13 together with conveying means along each side of the picking unit for receiving produce removed from the plants as the produce is moved laterally into a position above the conveying means for gravity movement of the produce onto the conveying means as it is removed from plants, said frame means including gauge wheels adjacent the forward and rearward ends thereof to control the elevational position of the frame means, said shaft including a sprocket gear at the rearward end thereof, a hydraulic motor and sprocket chain drive arrangement connected to the sprocket gear for driving said shaft, at least one additional picking unit oriented in parallel relation to the first mentioned picking unit and being identical thereto with the shaft on the second picking unit being driven from the hydraulic motor and sprocket chain drive arrangement in opposite directions to the first mentioned shaft.

* * * * *